No. 767,568. PATENTED AUG. 16, 1904.
M. E. KELLUM.
MACHINE FOR WASHING DISHES OR LINEN.
APPLICATION FILED FEB. 16, 1903.
NO MODEL.
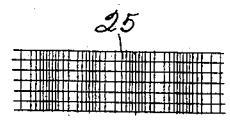
FIG. 4.
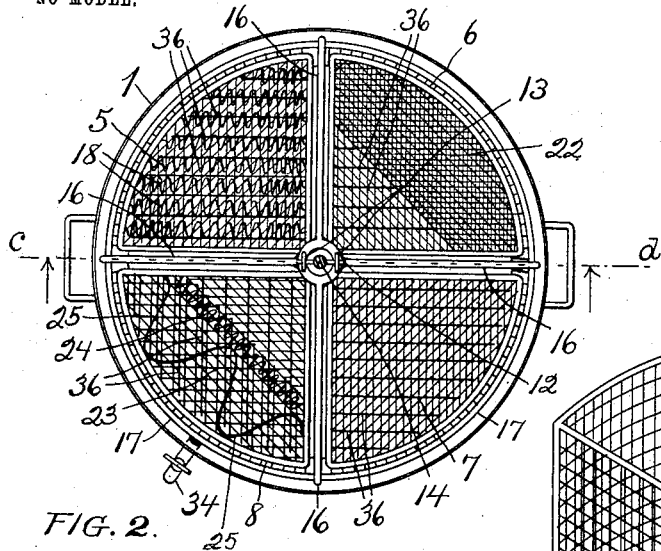
FIG. 2.
FIG. 3.
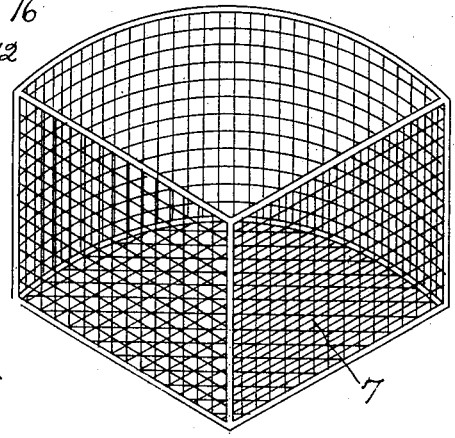
FIG. 1.
FIG. 5.
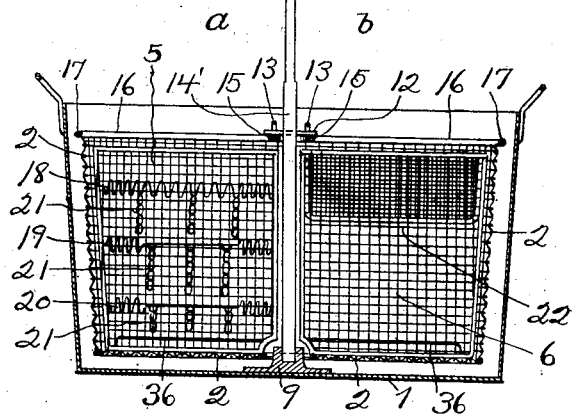
FIG. 6.
WITNESSES:
K. M. Imboden,
M. L. Lange
INVENTOR,
Margaret E. Kellum,
by Higdon & Higdon,
Attys.

No. 767,568. Patented August 16, 1904.

UNITED STATES PATENT OFFICE.

MARGARET E. KELLUM, OF KANSAS CITY, MISSOURI.

MACHINE FOR WASHING DISHES OR LINEN.

SPECIFICATION forming part of Letters Patent No. 767,568, dated August 16, 1904.

Application filed February 16, 1903. Serial No. 143,543. (No model.)

*To all whom it may concern:*

Be it known that I, MARGARET E. KELLUM, a citizen of the United States, residing at Kansas City, in the county of Jackson and State of Missouri, have invented new and useful Improvements in Machines for Washing Dishes or Linen, of which the following is a specification.

My invention relates to a machine for washing dishes, chinaware, or table-linen.

One object of this invention is to enable a person to wash dishes or chinaware without wetting the hands.

A further object is to enable a person to wash table-linen separately from underwear without immersing the hands in the water, as it is desirable that the table-linen be washed separately from clothing, &c.

A further object is to provide a machine for the above-named purposes which is low in price, simple in construction, small in size, and easy to operate, it thus being especially adapted for family use.

Referring now to the accompanying drawings, Figure 1 is a central vertical section of a machine constructed in accordance with my invention, the lid being raised. Fig. 2 is a sectional plan view of the machine without the lid. Fig. 3 is an enlarged perspective view of one of the quadrant-shaped baskets. Fig. 4 is an elevation of a partition-strip 25. Fig. 5 is an enlarged detail view showing the manner in which a rubber gasket is held by the lid. Fig. 6 is a reduced bottom plan view of the lid, the chains being omitted.

The principal parts of this machine are as follows: A receptacle 1, a rotary circular basket 2 within the receptacle, a lid 3, provided with depending chains 4, and four quadrant-shaped baskets 5, 6, 7, and 8, held within the circular basket 2.

Secured centrally to the bottom of the receptacle 1 is a step-bearing 9, in which rests the lower end of a vertical shaft 14, on the upper end of which is a crank 10. A strong pin 12 passes through the shaft 14, and straddling said pin 12 are two staples 13, to which is secured a metallic ring 15. Secured to said ring 15 are the inner ends of four radial rods 16, spaced equally, as shown, and their outer ends are secured to a metallic ring 17, which forms the top of the aforesaid circular basket 2. The side and bottom of said basket are made of wire-cloth of a suitable gage.

Supported within the respective quarters of basket 2 are four quadrant-shaped baskets 5, 6, 7, and 8. These baskets are nearly as deep as their inclosing basket 2. Their frames are made of rod or heavy wire and their sides and bottoms of wire-cloth, as shown in Fig. 3. Hereinafter the quadrant-shaped baskets 5, 6, 7, and 8 will be termed the "small" baskets. At least one of the small baskets, as 5, contains three beds of wires or springs 18, 19, and 20. (See Fig. 1.) The top bed consists of helical springs 18, stretched apart so that their turns are somewhat separated. The middle bed consists of springs 19, connected by straight wires 19'—in other words, of straight wires 19' having springs 19 at their ends. The bottom bed is composed of the same kind of wires or springs as the middle bed described. From each of said wires or springs are suspended several short chains, as 21. The other small baskets, 6, 7, and 8, are shown without these wires or springs, but may be provided with them, if so desired.

In one of the small baskets, as 6, is placed a shallow segmental basket 22, the purpose of which is to hold knives, forks, and spoons. This basket 22 may be removed from its supporting-basket 6 in order to permit the placing of dishes or other articles within the latter.

One of the small baskets, 8, is provided with a partial or segmental false bottom 23, which should be about three inches from the top of said basket. This false bottom is adapted to support cups having handles which might be easily broken. Stretched across the basket above the inner edge of the false bottom 23 is a helical spring 24. To separate the cups from one another, I set upon said false bottom an upright sinuous partition 25, which may be a strip of wire-cloth, as shown in Fig. 4. The cups may be placed between the turns of said strip 25 and between said turns and the spring 24. Even fine china cups held thus may be washed without danger of breakage, and the handles of the cups will be protected as well as the cups. Through the triangular opening in the top of the small basket 8 dishes or other objects may be placed in said basket and removed therefrom.

The lid 3 when in position rests within the top of the pan 1. Secured to the top of the lid is an upper bearing 26 for the shaft 14. Above its journal 14' said shaft is reduced in size, as shown, whereby the lid 3 may easily be raised to the position shown and there supported by a hook 27, which is passed over the crank 10.

Secured to the bottom of the lid 3 are four staples or eyes 28, preferably arranged as shown in Fig. 6. Suspended from these eyes or staples are four short rods or wires 29, each of which supports several chains 4. These chains and the aforesaid chains 21 are adapted for removing certain substances from the dishes which the water alone would not thoroughly remove.

The rim of the lid 3 is provided with a rubber ring 30, the object of which is to form a practically water-tight joint with the lid. One manner of attaching the rubber ring 30 to the lid is shown in Fig. 5. The rim of the lid is doubled in and then outwardly flanged, forming a groove in which the upper edge of the ring 30 is seated. I prefer that said ring flares downwardly, as shown, and when the lid is forced down into the receptacle 1 the ring 30 will be turned up and will adhere strongly to the inside of the pan. To provide for the escape of steam or vapor from the water, a vent-opening 31 is cut in the lid 3, and a tube 32 may be connected to said opening, so that the water, if agitated, may not splash out through said opening and collect upon the lid.

Connected to the pan, near the bottom thereof, is a drain-cock 34, through which the water may be drawn off after a washing.

The operation of this machine is as follows: The dishes, excepting cups with handles, are placed in the small baskets 5, 6, 7, and 8 with their lower edges resting between the bottom rods 36, which prevent the dishes from lying flat in the bottoms of said baskets. In basket 5 the dishes are held by and between the springs or wires 18, 19, and 20. As stated hereinbefore, the other baskets, 6, 7, and 8, may also be provided with such springs or wires. The cups with handles are placed upon the false bottom 23 of basket 8, as already described. Said false bottom may be made detachable from basket 8, if so desired. The knives, forks, and spoons are placed in the shallow basket 22, which is then placed in the top of basket 6. The lid 3 is lowered into the top of the pan in such a position that the four sets of chains 4 will hang into the respective baskets 5, 6, 7, and 8. The pan being nearly filled with hot water, the crank 10 is oscillated to the right and left (not revolved) in such a manner that the radial rods 16 will not pass under chains 4, but the dishes will be rubbed by said chains 4 as they pass thereunder, and the dishes will also be rubbed by chains 21, suspended from the wires or springs 18, 19, and 20. When the dishes and silver are clean, the lid is raised and held up by its hook 27 and the water is drawn off through cock 34. When the dirty water has escaped, pour clear hot water over the dishes and silver to rinse the same, then lower the lid, and then oscillate the crank rapidly to right and left, which will rotate the baskets and throw off the water by centrifugal force. The heat of the dishes will cause the adhering water to evaporate, and the dishes will thus be dry when taken from the machine.

To wash table-linen, remove the four quadrant-shaped baskets from the large circular basket 2 and place the linen in this basket. The lid 3 is lowered and the chains 4 will hang among the linen. If it is not desired to employ these chains when washing linen, they may be removed from the lid. For that purpose hooks may be substituted for the eyes or staples 28. The pan 1 may be set on a stove, if it be desired to "boil" the linens, and the crank 10 may be oscillated or turned during this process.

Having now fully described my invention, what I claim as new, and desire to secure by Letters Patent of the United States, is—

1. In a machine of the class described, the combination of a rotary outer wire basket, a sector-shaped wire basket adapted to be placed therein, helical springs crossing the interior of said sector-shaped basket, and wires also crossing the interior of said basket, the end portions of said wires being coiled; substantially as described.

2. In a machine of the class described, the combination of a sector-shaped wire basket, helical springs crossing the interior thereof, and chains depending from said springs; substantially as described.

In testimony whereof I affix my signature in the presence of two witnesses.

MARGARET E. KELLUM.

Witnesses:
 M. L. LANGE,
 JAMES F. YEAGER.